(12) United States Patent
Rodriguez

(10) Patent No.: US 11,817,961 B2
(45) Date of Patent: Nov. 14, 2023

(54) POWER OVER ETHERNET DRIVER MODULE

(71) Applicant: LV Energy Systems, LLC, Las Vegas, NV (US)

(72) Inventor: Jesus Rodriguez, Brick Township, NJ (US)

(*) Notice: Subject to any disclaimer, the term of this patent is extended or adjusted under 35 U.S.C. 154(b) by 0 days.

(21) Appl. No.: 17/067,024

(22) Filed: Oct. 9, 2020

(65) Prior Publication Data

US 2021/0109581 A1    Apr. 15, 2021

Related U.S. Application Data

(60) Provisional application No. 62/912,695, filed on Oct. 9, 2019.

(51) Int. Cl.
| | |
|---|---|
| G06F 1/00 | (2006.01) |
| H04L 12/10 | (2006.01) |
| H04L 12/40 | (2006.01) |
| H05B 47/18 | (2020.01) |
| G06F 1/26 | (2006.01) |

(52) U.S. Cl.
CPC .............. *H04L 12/10* (2013.01); *G06F 1/266* (2013.01); *H04L 12/40045* (2013.01); *H05B 47/18* (2020.01)

(58) Field of Classification Search
CPC ...................................................... H04L 12/10
See application file for complete search history.

(56) References Cited

U.S. PATENT DOCUMENTS

| | | | |
|---|---|---|---|
| 9,295,142 B1* | 3/2016 | Leinen ................... | H05B 47/18 |
| 10,004,120 B1* | 6/2018 | Bell ........................ | H04L 12/10 |
| 2018/0054083 A1* | 2/2018 | Hick ........................ | H02J 9/06 |
| 2018/0063928 A1* | 3/2018 | Hick ..................... | H05B 47/185 |
| 2018/0092191 A1* | 3/2018 | Siefer ..................... | H05B 47/19 |
| 2018/0228007 A1* | 8/2018 | Siefer ..................... | H05B 47/18 |
| 2018/0278488 A1* | 9/2018 | Kutty ...................... | H04L 12/10 |
| 2019/0356162 A1* | 11/2019 | Crenshaw ............. | H02J 7/0047 |

* cited by examiner

*Primary Examiner* — Mohammed H Rehman
(74) *Attorney, Agent, or Firm* — Andrew Morabito

(57) ABSTRACT

The present invention is a Power over Ethernet (PoE) control module, comprising; an input connector adapted to receive a connection from a first cable, wherein the first cable provides a power signal and a command signal; an output connector adapted to receive a connection from a second cable, wherein the second cable sends a power signal to a set of light fixtures; a bridge circuitry connected to the input and output connectors, wherein the bridge circuitry separates the command signal from the power signal; and a microcontroller connected to the bridge circuity, wherein the microcontroller processes the command signal and sends the command signal to the set of light fixtures wirelessly.

19 Claims, 2 Drawing Sheets

POWER OVER ETHERNET DRIVER MODULE

CROSS-REFERENCE TO RELATED APPLICATIONS

This application is a continuation-in-part (and claims the benefit of priority under 35 USC 120) of U.S. application Ser. No. 62/912,695 filed Oct. 9, 2019. The disclosure of the prior applications is considered part of (and is incorporated by reference in) the disclosure of this application.

BACKGROUND

This disclosure relates generally a power over Ethernet (PoE) system, and particularly to the PoE system and the method of operation of the PoE system.

Presently, many buildings have complicated electrical wiring systems that are installed when the building is first built. These wiring systems are typically required to be installed by a certified electrician, and the placement of overhead lighting and electrical outlets is predetermined by the wiring system that is pre-installed in the building. After the building is built, adding or moving light fixtures may be complicated and costly, requiring substantial re-wiring by an electrician.

Each light in a building may also be connected to a light switch module that is used for turning it on and off. The placement of this switch is also pre-determined by the electrical wiring system when the building is first built. Moving the placement of the light switch modules or altering the control of the switch later typically also requires an electrician to re-wire the relevant portion of the house, which can be very complicated and costly.

These existing electrical distribution systems are typically high voltage (100-250V) AC (alternating current). Newer lighting technologies, like LED (light-emitting diode) lights, are more efficient than incandescent and even fluorescent lighting. However, they are inherently low voltage DC (direct current) driven devices. Adapting these devices to work in an existing AC distribution system requires conversion of the power sources, resulting in additional costs and complications.

Power over Ethernet (PoE) is a technology for supplying low voltage current and data over a common point-to-point Ethernet network cable to locations with applications that require both mediums. In some cases, power is carried on the same conductors that carry data. In other cases, power is carried on dedicated conductors within the same cable. Applications that currently benefit from PoE technology include Voice over Internet Protocol (VoIP), IP cameras, wireless local area networks (WLAN), Wireless Access Points, Building Automation Systems (BAS), and security and access control systems.

PoE has several advantages over traditional power systems used in homes and commercial buildings. For example, PoE systems are relatively low voltage, thus eliminating the need to run expensive high voltage wiring and conduit for lighting. In addition, installation of PoE wiring can be faster than with traditional power systems because Ethernet cabling employs simple plug-in end connections. Where Ethernet cabling is already in place (i.e., for data transmission), PoE functionality can be achieved without the need for additional wiring installation.

With the increase in power provided by modern PoE systems, it would be desirable to provide a PoE system capable of controlling and powering a variety of light emitting diode (LED) lighting system components. The system should be inexpensive, easy to install, and easy to configure and control. The system should also be able to power and/or control other low voltage devices, such as occupancy sensors, photodetectors, wall switches and the like.

The power over Ethernet devices do not require separate power supply lines. In some instances, the power may be supplied by a power supply contained within an Ethernet switch or within the system. Due to this, the power supply does not generally have the power capability to supply maximum power to every port, there is a limit on the number of power over Ethernet devices that can be connected to a given power supply. A port may be denied power, if it will result in oversubscription of the power supply. Example power over Ethernet devices that can benefit from receiving power over the Ethernet communication lines include an internet protocol telephone, a badge reader, a wireless access point, a video camera, and others.

Traditionally, when a power over Ethernet device is connected to a power supply, the power over Ethernet device is allocated a maximum power class. These maximum values correspond to the maximum amount of power that will be supplied by the power supply to the power over Ethernet device.

Therefore, it is desired for a PoE system that provides for ease of installation within the building, simplification of the integration of new fixtures, and a user-friendly experience to control and use the PoE system.

SUMMARY

In a first embodiment, the present invention is a Power over Ethernet (PoE) control module, comprising: a signal transformer to receive a power and command signal; a bridge connected to the signal transformer which separates the power and command signals; a transceiver connected to the bridge; a driver connected to the bridge; and a microcontroller in communication with the bridge and the driver.

In a second embodiment, the present invention is a a Power over Ethernet (PoE) control module to: receive a signal, wherein the signal has a command and power aspect; conditioning the command and the power aspects of the signal, and providing the command aspect of the signal to a microcontroller and the power aspect of the signal to a bridge circuitry; sending the conditioned command aspect of the signal wireless to a light fixture and sending the power aspect of the signal through a wired connection with the light fixture.

In a third embodiment, the present invention is a Power over Ethernet (PoE) control module, comprising: an input connector adapted to receive a connection from a first cable, wherein the first cable provides a power signal and a command signal; an output connector adapted to receive a connection from a second cable, wherein the second cable sends a power signal to a set of light fixtures; a bridge circuitry connected to the input and output connectors, wherein the bridge circuitry separates the command signal from the power signal; and a microcontroller connected to the bridge circuity, wherein the microcontroller processes the command signal and sends the command signal to the set of light fixtures wirelessly.

BRIEF DESCRIPTION OF THE DRAWINGS

Referring now to the drawings in which like reference numbers represent corresponding parts throughout.

DETAILED DESCRIPTION

The present invention generally relates to a PoE (Power over Ethernet) Driver module for a PoE Lighting system. The driver is used for powering and controlling a variety of lighting system components using PoE technology. In some embodiments, the lighting systems include a plurality of light fixtures including one or more light emitting diode (LED) elements. With power provided over Ethernet cabling, it can be practical to power one or more LED fixtures using PoE. To harvest the power from the Ethernet cable, an LED fixture can employ a simple bridge rectifier along with a resistive "signature" to communicate the LED fixture's power needs. This circuit can be connected directly to the Ethernet input transformer. The rectified power can then be fed to an LED driver circuit to power the individual LEDs in the LED fixture. In some embodiments, a power conversion can be employed to provide power to a microcontroller which can receive commands via the Ethernet cable and can signal the LED driver circuit with intensity information.

Providing this ease of installation and flexibility of control can be an advantage. Providing the electronics described above for each individual fixture, however, can be expensive. In view of this, the disclosed system can include an arrangement in which power and a control output generated with the aforementioned electronics are connected from a primary fixture to other, simpler, fixtures that are fitted with only a simplified LED driver circuit. The result can be a system in which several fixtures that would normally be controlled together can be powered and controlled relatively easily and inexpensively.

Figure 1:
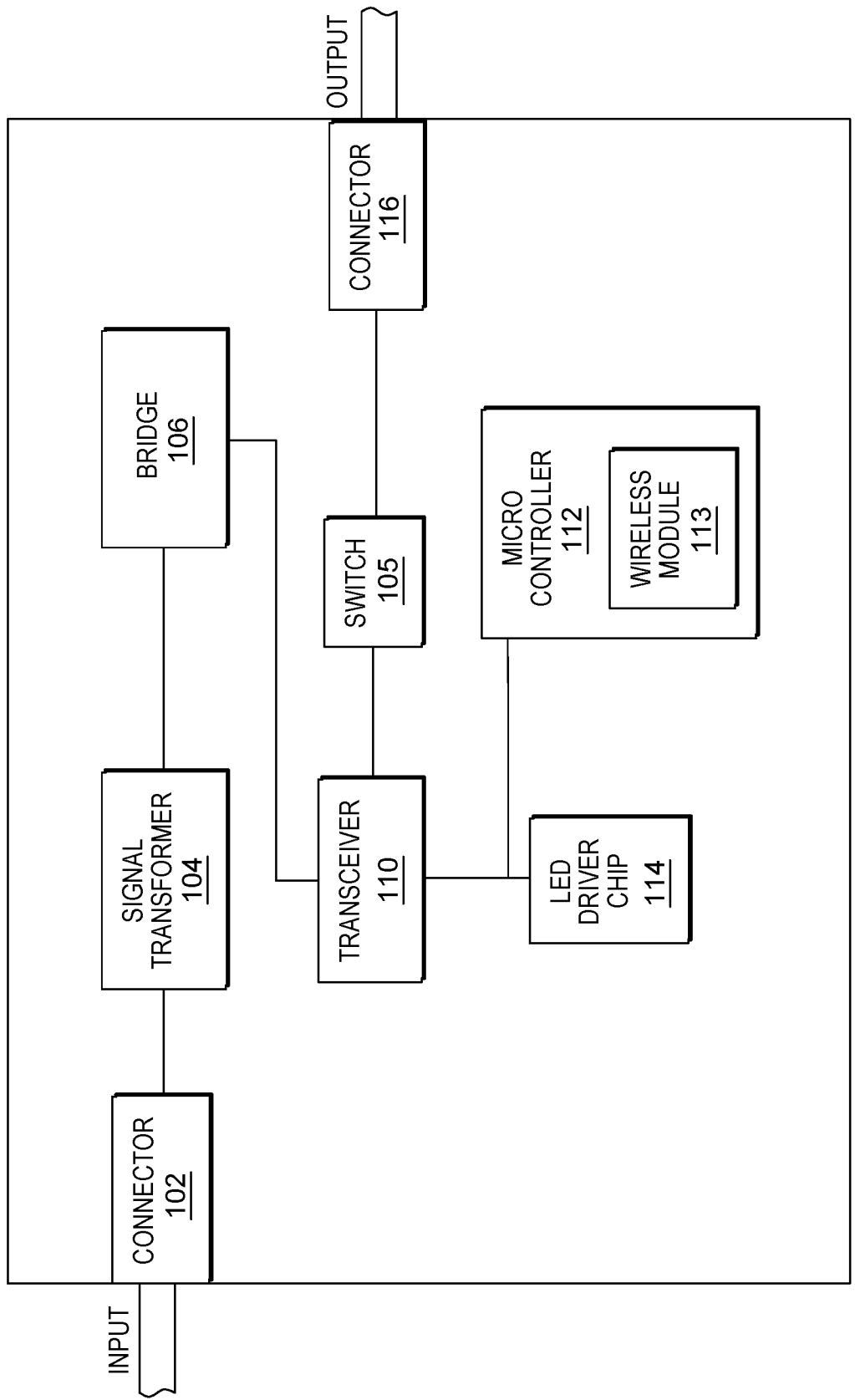
FIG. 1 depicts a block diagram of a PoE Driver, according to an embodiment of the present invention.
Figure 2:
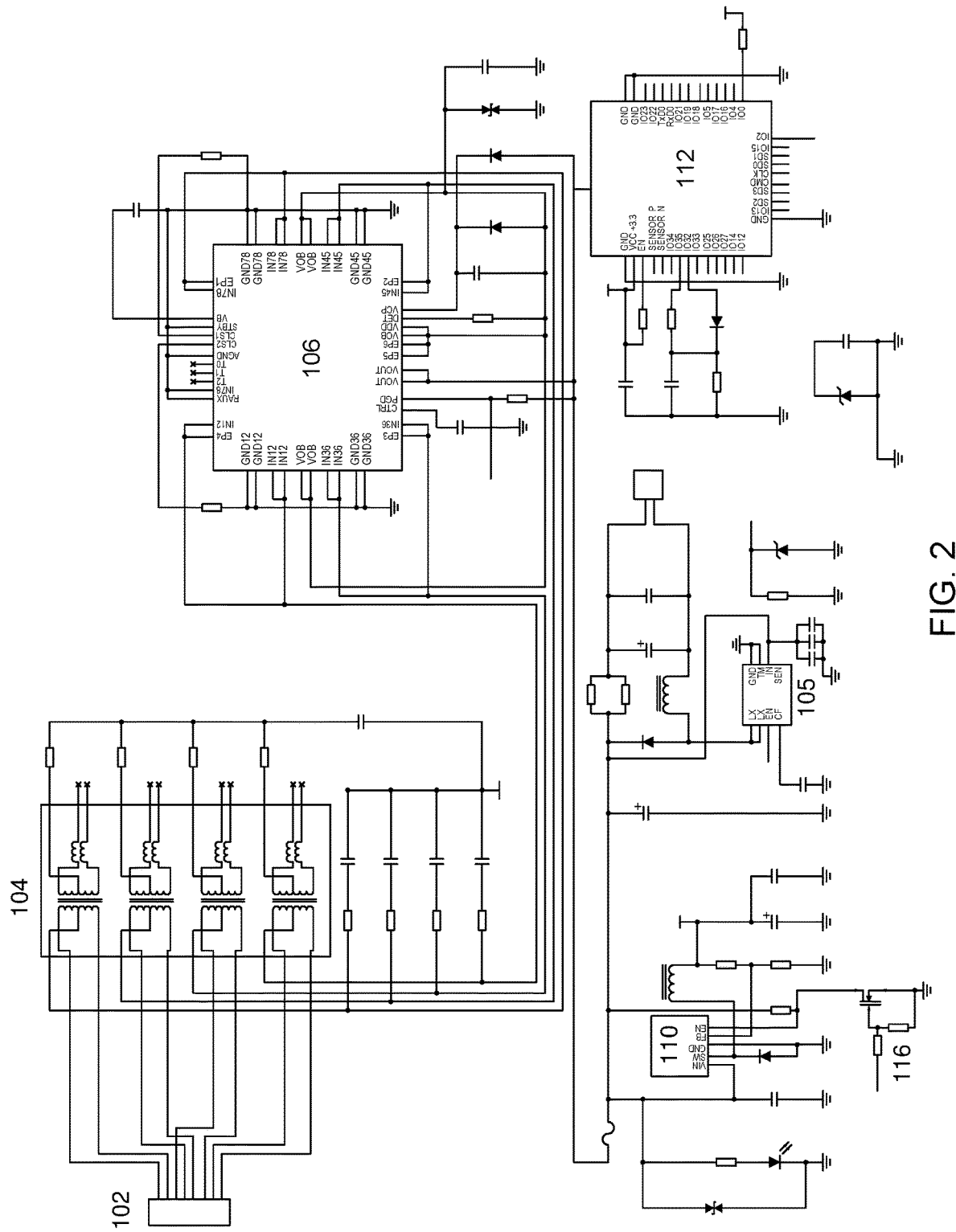
FIG. 2 depicts a schematic diagram of the PoE Driver, according to an embodiment of the present invention.

Referring to FIGS. 1 and 2, a driver is shown. To power and control the individual lighting elements of a system, the system requires a PoE (Power over Ethernet) Driver 100 to condition the power received from a PoE switch and to receive and react to control signals received from a control source such as a wall switch. The PoE Driver 100 is able to intelligently extract the data from the power. At least one light fixture may include a controller connected to the PoE driver 100. The controller can be controlled by the PoE Driver 100 to drive additional connected fixtures without the need for additional power, signal conditioning and/or an additional microcontroller. The PoE Driver 100 may receive command signals via a PoE switch and may control the connected light fixtures accordingly.

Thus arranged, one or more of the light fixtures that are connected to the PoE Driver 100 can be used to control and power one or more connected light fixtures that include a controller. The light fixtures can be daisy chained to attached in series to a single PoE Driver 100 provided the PoE Driver 100 maximum voltage is not exceeded. The power is provided over the ethernet cabling and the control is provided through a wireless signal from the PoE Driver 100 to the light fixtures.

PoE Driver 100 can power and control one or more light fixtures (with a controller) via an associated power and communication link, which in one embodiment is an Ethernet cable. In addition, the PoE Driver 100 can also power one or more low voltage devices, such as a low voltage occupancy sensor, a low voltage photocell or a low voltage wall switch via appropriate low voltage wiring. Signals from the low voltage devices will be passed back through the system, which will control operation of the system in accordance with the received signals.

In the disclosed lighting power and control system, each of the plurality of light fixtures will have a controller, which in the illustrated embodiment will be either the PoE Driver 100. The PoE Driver 100 can be used to control on/off status, dimming, and other desired characteristics of the associated light fixtures.

As previously noted, the PoE Driver 100 can have enhanced signal and power conditioning circuitry. The PoE Driver 100 can be connected to a plurality of light fixtures to benefit from the signal and power conditioning provided by the PoE Driver 100. The light fixtures (with integrated controller) are, in this way, simplified which can reduce overall system complexity and cost. That is, the disclosed lighting power and control system can include a smaller number of more complex PoE Drivers 100 and a larger number of simpler light fixtures.

PoE Driver 100 may include connectors 102 and 116, such as an RJ-45 connector, for receiving an end connector of an associated first power and communication link to thereby receive power and communications signals from the PoE switch. The connector 102 is coupled to an appropriate Ethernet transformer 104 with center taps to allow for PoE to be transmitted through the PoE Driver 100 and adjusted according to the received command and sent through connector 116. Connector 116 may be able to send both power and command signals even though the command signal is sent wirelessly. This feature provides for a backup in the event of an emergency or if the microcontroller 112 or the wireless module 113 fail. The signal is split to a bridge 106, which extracts power from the first power and communication link via the Ethernet transformer 104 to provide a desired voltage, depending on the length of the first power and communication link. The transformed and rectified power is then provided to a power converter which provides a first voltage to power a transceiver module 110 and through a switch 105 to the connector 116 and to the light fixture. In one non-limiting exemplary embodiment, the PoE Driver 100 is able to handle a voltage up to and not to exceed 33.3 volts. Additional designs of the PoE Driver 100 may provide for higher voltage maximums. This is directly related to the wattage of the lights (e.g. 5 watts per light) which when converted to voltage does not exceed the 33.3 (or other voltage) maximum. The PoE Driver 100 may provide constant power to the light fixture and adjust the status of the light based on the wirelessly transmitted signal to the controller within the light fixture. Or in another embodiment, may the PoE Driver 100 may adjust the status of the light fixtures by directly adjusting the power sent to the light fixture based on the desired command.

The PoE Driver 100 wattage and voltage limitation is based on the internal components of the present PoE Driver 100. With the modification of the maximums or minimums of these components these values may be increased or decreased. The quantity of lights connected to the PoE Driver 100 (wired and wirelessly) is limited only by these internal components. Due to the power being transferred via the wired system and the command signal being sent wirelessly, A microcontroller 112 is integrated into the PoE Driver 100, to receive commands and control signals from the PoE LED driver 100 to the light fixtures wirelessly through an integrated wireless module 113. The wireless module 113 is able to communicate wirelessly with the switches, the light fixtures, and all other components in the system which have wireless communication abilities. Control signals from the microcontroller 112 are relayed wireless to the light fixtures as the PoE Driver 100 receives and sends the power from the switch to the light fixture. Thus, arranged, the control signals from the microcontroller 112 and power from the bridge 106 can be provided to the light fixture by wired and wireless connections respectively. In some embodiments the PoE Driver 100. As will also be appreciated, that although the description will proceed with reference to a driver "chip" associated with the microcontroller 112, the PoE Driver 100 may instead be implemented using a driver "circuit," in lieu of a discrete chip. Thus, the term "chip" I in relation to the Controller will be understood in this disclosure to include either a discrete chip, an appropriate circuit, or a combination thereof.

The microcontroller 112 can also be connected to the low voltage sensors and switches, such as occupancy sensor, photodetector and wall switch, to receive analog inputs therefrom. The microcontroller 112 can sense the state of the switch, sensor or photodetector and wireless send the command to activate or deactivate the light fixture. In some embodiments, the microcontroller 112 has integrated memory to store settings (e.g. emergency modes), commands, and other data related to the processing of the command signal, and the fluctuation of the power signal to the light fixtures to produce the desired outcome. In some embodiments, when the power signal drops or is cut off, the microcontroller 112 sends a wireless signal to the light fixtures to active the emergency protocol, A backup battery for emergency lighting is centralized for all fixtures and remote of each fixture allowing for all fixtures in the system to operate as emergency light fixtures. In the event of a power outage that also cuts off internet connectivity the backup cellular network on the system will relay the signal to the cloud controller to initiate the emergency lighting protocol.

Either in response to control signals received via the PoE Driver 100 or from the analog inputs, the microcontroller 112 may provide an output signal, which in one exemplary embodiment, may include a dimming control signal, to a light fixture. It will be appreciated that a direct control connection from the analog inputs may be present and the command may be sent by a wired and a wireless connection dependent upon the changes in the systems state. It will also be appreciated that although the description will proceed with reference to a driver "chip," that the system may instead be implemented using a driver "circuit," in lieu of a discrete chip. Thus, the term "chip" will be understood throughout this disclosure to include either a discrete chip, an appropriate circuit, or a combination thereof.

As can be seen the LED driver chip 114 is supplied with a driving voltage from the bridge 106. The LED driver chip 114 is wide input voltage range Dc/DC regulator and assists in the providing of the proper power to the light fixtures. This constant current can be tuned to the specific light fixture to meet the particular needs. In one embodiment, the LED driver chip 114 can have the capability to be commanded to vary the constant current via its I²C interface. Alternately, an external resistor (not shown) can be employed to set the current level. In some embodiments the LED driver chip 114 may have a set amount of current. In other embodiments the current may be programmable via the first power and communications link or another link coupled to the chip's I²C interface.

In one embodiment, the maximum current that a particular Light fixture requires is what the LED driver chip 114 will provide. To dim the Light fixture, the LED driver chip 114 can employ pulse width modulation (PWM) in a manner known to those of ordinary skill in the art. It will be appreciated that dimming techniques other than, or in addition to, PWM can be used to provide a desired dimming function.

The LED driver chip 114 of the PoE Driver 100 can connect to a Light fixture associated with one of the pluralities of light fixtures to provide a constant current to the Light fixture. This constant current can be tuned to the specific Light fixture 118 to meet the particular needs of the array. In one embodiment, the LED driver chip 114 will apply the maximum current that the particular Light fixture 118 requires. To dim the Light fixture 118, the LED driver chip 114 may employ pulse width modulation in a manner known to those of ordinary skill in the art.

Thus arranged, the PoE Driver 100 provides the microcontroller 112 with the desired power to be sent to the light fixture and the LED driver chip 114 communicates with Bridge 106 to send the desired power to the light fixture (e.g. to turn off, turn off, dim, or strobe, etc.).

As previously noted, the total number of light fixtures that can be fed from a single PoE Driver 100 is limited only by the total amount of PoE deliverable via the communications links and the PoE Driver 100. Similarly, the LED driver chip 114 will be provided with the same dimming and other control information, via the communication link.

It will be appreciated that although the power and communication link may be an RJ-45/CAT5/CAT6 or other appropriate connection. The advantage of the wireless command signal and the wired power, is that the loss of the command signal due to a high volume of wired connection, the wireless command signal is not degraded or delayed over the wireless connection regardless of the number of drivers, wires, and light fixtures. This is because the control signals and power delivered to the light fixtures is conditioned by the circuitry of the PoE Driver 100.

Each PoE Driver 100 has a microcontroller 112, and thus all of the light fixtures may be controlled together via the microcontroller 112 (which are within the limitations of voltage and wattage restrictions of the PoE Driver 100). In some embodiments the microcontroller 112 generates a single control signal that is provided to the light fixtures wirelessly, as each light fixture as a wireless module to receive and send signals to the microcontroller 112. In this way, all of the Light fixtures wired to the PoE Driver 100 can be controlled together using a single PoE Driver 100 (e.g. microcontroller 112). In one embodiment this simultaneous control may be an on-off control. In other embodiments this simultaneous control may be a dimming control using a known pulse width modulation (PWM) scheme.

In some embodiments, each Controller may be controlled individually. Under this scheme, the PoE Driver 100 could be provided with multiple control channels, one for itself and one for each of the Controllers 112. The control message received by the PoE Driver 100 microcontroller 112 could contain control information for more than one channel. The control link on the slave connection could include a software addressing arrangement and each Controller could include an arrangement for setting an address.

A method for using the disclosed system may include the steps of receiving a power and control signals by a PoE Driver 100. The received power is conditioned and provided to a microcontroller associated with the PoE Driver 100. In some embodiments the received power is conditioned using a bridge 106, and optionally, a converter. The first control signal(s) are conditioned and provided to the microcontroller. In some embodiments the received control signals are conditioned using a transformer 104. The conditioned power and the conditioned control signals are received at a first LED driver associated with the PoE Driver 100. An associated lighting fixture is operated in response to the conditioned power and the conditioned control signals. In some embodiments, the lighting fixture includes a Light fixture. Operating the lighting fixture can include dimming the Light fixture. The associated lighting fixture is operated in response to the conditioned power and the conditioned control signals. In some embodiments, the lighting fixture includes a Light fixture. Operating the lighting fixture can include dimming the Light fixture.

In some embodiments the power and control signals can be provided to the PoE driver via a first power and control signal communication link, while conditioned power and conditioned control signals can be provided to the driver via a power and control signal communication link. In some embodiments the power and control signal communication links are CAT5/CAT6 cables or any other cable type capable of carrying power and control signals.

Some embodiments of the disclosed device may be implemented, for example, using a storage medium, a computer-readable medium or an article of manufacture which may store an instruction or a set of instructions that, if executed by a machine (i.e., processor or microcontroller), may cause the machine to perform a method and/or operations in accordance with embodiments of the disclosure. Such a machine may include, for example, any suitable processing platform, computing platform, computing device, processing device, computing system, processing system, computer, processor, or the like, and may be implemented using any suitable combination of hardware and/or software. The computer-readable medium or article may include, for example, any suitable type of memory unit, memory device, memory article, memory medium, storage device, storage article, storage medium and/or storage unit, for example, memory (including non-transitory memory), removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Embodiments of the invention further include a power loss monitor, which determines whether power is being provided over the normal lighting LED driver or whether there has been an interruption of power. When the power loss monitor detects a loss of power from the normal lighting LED driver, a controller, which is connected to the power loss monitor, connects one input of the relaying device to the LED lamp. However, when the normal LED driver has power, the other input of the relaying device is connected to the LED lamp.

While certain embodiments of the disclosure have been described herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision additional modifications, features, and advantages within the scope and spirit of the claims appended hereto.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

The foregoing descriptions of various embodiments have been presented only for purposes of illustration and description. They are not intended to be exhaustive or to limit the present invention to the forms disclosed. Accordingly, many modifications and variations of the present invention are possible in light of the above teachings will be apparent to practitioners skilled in the art. Additionally, the above disclosure is not intended to limit the present invention. In the specification and claims the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

Although various representative embodiments of this invention have been described above with a certain degree of particularity, those skilled in the art could make numerous alterations to the disclosed embodiments without departing from the spirit or scope of the inventive subject matter set forth in the specification and claims. Joinder references (e.g. attached, adhered, joined) are to be construed broadly and may include intermediate members between a connection of elements and relative movement between elements. As such, joinder references do not necessarily infer that two elements are directly connected and in fixed relation to each other. Moreover, network connection references are to be construed broadly and may include intermediate members or devices between network connections of elements. As such, network connection references do not necessarily infer that two elements are in direct communication with each other. In some instances, in methodologies directly or indirectly set forth herein, various steps and operations are described in one possible order of operation, but those skilled in the art will recognize that steps and operations may be rearranged, replaced or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

Although the present invention has been described with reference to the embodiments outlined above, various alternatives, modifications, variations, improvements and/or substantial equivalents, whether known or that are or may be presently foreseen, may become apparent to those having at least ordinary skill in the art. Listing the steps of a method in a certain order does not constitute any limitation on the order of the steps of the method. Accordingly, the embodiments of the invention set forth above are intended to be illustrative, not limiting. Persons skilled in the art will recognize that changes may be made in form and detail without departing from the spirit and scope of the invention. Therefore, the invention is intended to embrace all known or earlier developed alternatives, modifications, variations, improvements and/or substantial equivalents.

What is claimed is:

1. A Power over Ethernet (PoE) system, comprising:
a control module comprising;
   a signal transformer to receive a power and command signal connected to an input connector;
   a bridge connected to the signal transformer which separates the power and command signals;
   a transceiver connected to the bridge;
   a driver connected to the transceiver;
   a switch connected to the transceiver and an output connector;
   a microcontroller in communication with the bridge and the driver, wherein the microcontroller has an emergency mode, wherein the emergency mode is activated based on the received command signal; and
   a wireless module integrated into the microcontroller, wherein the wireless module sends the command signal;
a plurality of fixtures wirelessly and wired connected to the control module;
a battery connected to the plurality of fixtures and the control module.

2. The POE control module of claim 1, wherein the microcontroller receives the command signal and processes the command signal.

3. The POE control module of claim 1, wherein the control module is limited by the total wattage of the light fixtures.

4. The POE control module of claim 3, wherein the limit of the control module voltage is 33.3 volts.

5. The POE control module of claim 1, wherein the maximum voltage of the control module is the total voltage of the light fixtures which are powered by the control module.

6. The POE control module of claim 1, wherein the bridge monitors the power signal to detect a change in the power signal.

7. The POE control module of claim 1, wherein the connection is an RJ-45 connection.

8. The POE control module of claim 1, wherein the microcontroller further comprises, a memory unit.

9. The POE control module of claim 1, wherein the received command signal adjusts the power signal sent to the at least one fixture.

10. The POE control module of claim 1, wherein the received command signal adjusts the command signal sent to the at least one fixture.

11. A Power over Ethernet (PoE) control module emergency operation mode, comprising:
   monitoring low voltage sensors, wherein a command is received from at least one of the low voltage sensors;
   sending a signal to activate a fixture, wherein the signal has a command and power aspect;
   conditioning the command and the power aspects of the signal, and providing the command aspect of the signal to a microcontroller and the power aspect of the signal to a bridge circuitry;
   sending the conditioned command aspect of the signal wirelessly to a fixture and sending the power aspect of the signal through a wired connection with the fixture.

12. The Power over Ethernet (PoE) control module of claim 11, wherein the received power signal is limited by the control module maximum voltage.

13. The Power over Ethernet (PoE) control module of claim 11, wherein the bridge circuitry is able to separate the command aspect of the signal from the power aspect of the signal.

14. A Power over Ethernet (PoE) control module, comprising:
   an input connector adapted to receive a connection from a first cable, wherein the first cable provides a power signal and a command signal;
   an output connector adapted to receive a connection from a second cable, wherein the second cable sends a power signal to a set of fixtures;
   a signal transformer connected to the input connector, wherein the signal transformer conditions the power signal based on a length of the cable from the control module to the set of fixtures;
   a bridge circuitry connected to the signal transformer and a switch, wherein the bridge circuitry separates the command signal from the power signal;
   a microcontroller connected to the bridge circuity, wherein the microcontroller processes the command signal and sends the individual command signals to each of the set of fixtures wirelessly, wherein if the microcontroller loses connection to the bridge circuity an emergency mode is activate; and
   the switch connected to the output connector and the microcontroller, wherein the microcontroller identifies the state of the switch and sends the wireless command signal based on the state of the switch.

15. The Power over Ethernet (PoE) control module of claim 14, wherein the input connector and the output connector of identical connector types.

16. The Power over Ethernet (PoE) control module of claim 14, wherein the input connector and the output connector are of differing connector types.

17. The Power over Ethernet (PoE) control module of claim 14, wherein the bridge circuity has a maximum voltage based on the voltage of the light fixtures.

18. The Power over Ethernet (PoE) control module of claim 14, further comprising a wireless module integrated into the microcontroller.

19. The Power over Ethernet (PoE) control module of claim 14, wherein the microcontroller is able to wirelessly communicate with multiple light fixtures wirelessly based on the maximum voltage of the bridge circuity which provides the light fixtures through a wired connection.

\* \* \* \* \*